United States Patent [19]

Herbst et al.

[11] Patent Number: 5,053,204
[45] Date of Patent: Oct. 1, 1991

[54] MULTIPLE FEED POINT CATALYTIC CRACKING APPARATUS USING ELUTRIABLE CATALYST MIXTURE

[75] Inventors: Joseph A. Herbst, Turnersville; Hartley Owen, Bell Mead, both of N.J.; Paul H. Schipper, Wilmington, Del.

[73] Assignee: Mobil Oil Corporation, Fairfax, Va.

[21] Appl. No.: 500,357

[22] Filed: Mar. 28, 1990

Related U.S. Application Data

[62] Division of Ser. No. 292,206, Dec. 20, 1988, Pat. No. 4,927,522.

[51] Int. Cl.$^5$ .............................................. B01J 8/08
[52] U.S. Cl. ................................... 422/213; 422/142; 422/145
[58] Field of Search ............... 422/139, 140, 141, 142, 422/143, 144, 145, 213; 208/120

[56] References Cited

U.S. PATENT DOCUMENTS

| | | | |
|---|---|---|---|
| 3,821,103 | 6/1974 | Owen | 422/145 X |
| 4,717,466 | 1/1988 | Herbst et al. | 208/120 X |
| 4,820,493 | 4/1989 | Haddad et al. | 422/143 |
| 4,826,586 | 5/1989 | Herbst et al. | 208/120 X |

Primary Examiner—Robert J. Warden
Assistant Examiner—Rebekah A. Griffith
Attorney, Agent, or Firm—Alexander J. McKillop; Charles J. Speciale; Richard D. Stone

[57] ABSTRACT

A catalytic cracking process and apparatus operates with multiple feed injection points to a riser reactor with several enlarged regions. An elutriable catalyst mixture is used, comprising a conventionally sized cracking catalyst and a faster settling, shape selective additive cracking catalyst. Straight run naphtha, and a light, $H_2$-rich aliphatic stream are added to the base of a riser reactor. A resid feed is added higher up in the riser, with a gas oil and recycled heavy cycle oil and naphtha streams added even higher up in the riser. The riser has an elutriating base, and an elutriating upper portion, which increase residence time of the shape selective zeolite additive relative to the conventionally sized cracking catalyst.

6 Claims, 2 Drawing Sheets

MULTIPLE FEED POINT CATALYTIC CRACKING APPARATUS USING ELUTRIABLE CATALYST MIXTURE

Cross Reference to Related Cases

This is a division of copending application Ser. No. 292,206, filed on Dec. 20, 1988, now U.S. Pat. No. 4,927,522.

FIELD OF THE INVENTION

The invention relates to the field of fluidized catalytic cracking (FCC units) wherein one or more heavy feeds are catalytically cracked in the absence of hydrogen to lighter products.

BACKGROUND OF THE INVENTION

In conventional fluidized catalytic cracking (FCC) processes, a relatively heavy hydrocarbon feed, e.g., a gas oil, is mixed with a hot regenerated cracking catalyst in the base of an elongated riser reactor and cracked to lighter hydrocarbons. The cracked products and spent catalyst are discharged from the riser and separated into a vapor phase and a catalyst phase. The catalyst passes through a stripper to remove entrained hydrocarbons from the catalyst, then catalyst is regenerated. The catalyst circulates between the reactor and the regenerator and transfers heat from the regenerator to the reactor, supplying heat for the endothermic cracking reaction.

Catalytic cracking processes are disclosed in U.S. Pat. Nos. 3,617,497, 3,894,923, 4,051,013, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

In U.S. Pat. No. 4,051,013, a naphtha feed and a gas oil feed are converted in the presence of an amorphous or zeolite cracking catalyst in a riser reactor to high octane gasoline.

Several FCC processes use a mixture of catalysts having different catalytic properties, e.g., U.S. Pat. No. 3,894,934 uses a mixture of a large pore zeolite cracking catalyst such as zeolite Y and a shape selective zeolite such as ZSM-5. The combined catalyst system (or mixture) produces a gasoline product of relatively high octane rating.

In U.S. Pat. No. 4,116,814, which is incorporated by reference, Zahner teaches use of two different kinds of catalyst, with catalyst separation in the fluidized regenerator. This approach will work, but when a low coke producing catalyst containing, e.g., ZSM-5, is used, it will spend a lot more time in the regenerator than is necessary and hence will experience more hydrothermal degradation than is necessary.

It would be beneficial if such a low coke-forming catalyst could be separated outside the regenerator.

The approach taken in U.S. Pat. No. 4,490,241, Chou, to keeping the ZSM-5 additive out of the regenerator is to make the additive very light, so that it can be collected in secondary cyclones downstream of the riser reactor. This patent is incorporated by reference. Use of very small, or light, particles of ZSM-5 additive which is recycled from secondary cyclones will work to keep the ZSM-5 out of the regenerator but will result in rapid loss of ZSM-5 additive with catalyst fines. Use of light, or low density, ZSM-5 additive will also minimze the residence time of the ZSM-5 in the riser reactor because the light catalyst will not "slip" in the riser as much as the conventional catalyst. The light ZSM-5 will be largely kept out of the regenerator, but at the price of less residence time in the riser reactor.

U.S. Pat. No. 4,336,160, incorporated by reference, reduces hydrothermal degradation of conventional FCC catalyst by staged regeneration. However, all the catalyst from the reactor still is regenerated, thus providing opportunity for hydrothermal degradation.

Although FCC processes using very active zeolite based catalysts, or mixtures of two or more zeolite catalysts are known, they have not been used much for cracking of hydrogen-deficient feeds such as resids.

Hydrogen-deficient heavy hydrocarbon feeds such as resids, syncrudes, etc., are usually cracked to more valuable products by thermal cracking, perhaps with a hydrogen donor diluent material. The hydrogen donor diluent is a material which can release hydrogen to a hydrogen-deficient oil in thermal cracking.

Resids are not routinely cracked in FCC units for several reasons, one being too much coke formation. Coke formed during catalytic cracking is usually a hydrocarbonaceous material sometimes referred to as a polymer of highly condensed, hydrogen-poor hydrocarbons. Resids make a lot of coke, and conventional FCC's can only tolerate small amounts of resid and similar materials in the feed.

Although modern zeolite cracking catalysts, e.g., using zeolites X and Y, are low coke producing catalysts, FCC's still do not tolerate much resid in the feed.

Because heavy hydrogen deficient feeds are so hard to upgrade catalytically, refiners usually resort to thermal processing as a "last resort". Visbreaking and coking are the preferred way of dealing with resids. Visbreaking reduces the viscosity of a heavy fuel fraction. Coking produces valuable liquid products, but converts a good portion of the feed to low value coke, frequently 20 to 30 wt % coke is produced.

In U.S. Pat. No. 4,035,285, a low molecular weight carbon-hydrogen contributing material and high molecular weight feedstock, e.g., a gas oil, are combined and reacted in the presence of one or more zeolite catalysts, e.g., zeolite Y with ZSM-5. The resulting cracking and carbon-hydrogen additive products are superior to those formed in the absence of the low molecular weight carbon-hydrogen contributing material. Advantages of the process include improved crackability of heavy feedstocks, increased gasoline yield and/or higher gasoline quality (including octane and volatility), and fuel oil fractions of improved yield and/or burning quality and lower levels of potentially polluting impurities such as sulfur and nitrogen. In addition, the need for high pressure hydrotreaters and hydrocrackers is reduced or eliminated.

A similar process in which full range crude oils and naphtha are catalytically cracked in the presence of such low molecular weight carbon-hydrogen contributing material and zeolites in separate risers of a multiple riser catalytic cracking unit is described in U.S. Pat. No. 3,974,062.

In spite of the many advances made, there is still a need for an FCC process which can upgrade heavy, hydrogen-deficient feeds without overwhelming the FCC regenerator with coke. It would be beneficial if mixtures of different kinds of catalyst could be used for the upgrading, with customized treatment of each kind of catalyst to maximize the potential of each catalyst.

There is also a need in the FCC process for a way to more efficiently upgrade naphtha boiling range streams in FCC reactors.

A way has now been discovered to upgrade heavy, residual refractory stocks, and to efficiently upgrade straight run and recycle naphtha fractions.

BRIEF SUMMARY OF THE INVENTION

Accordingly, the present invention provides a fluidized catalytic cracking process wherein a source of hot, regenerated cracking catalyst having a settling velocity contacts a heavy hydrocarbon feed in a vertical riser reactor, having a cross-sectional area and a base, to produce a mixture of cracked products and spent catalyst, wherein spent catalyst is stripped and charged to a catalyst regeneration zone to produce the hot, regenerated catalyst characterized by use of an elutriable mixture of conventionally sized FCC catalyst and a separate additive catalyst having a higher settling velocity than the conventionally sized FCC catalyst and comprising a shape selective zeolite having a Constraint Index of about 1–12 in a riser having a lower and an upper elutriating section of increased cross-sectional area relative to the riser, and further characterized by charging to said lower elutriating section at least a portion of said elutriable catalyst mixture and a hydrocarbon feed comprising 1–50 wt % of a light, hydrogen-rich fraction comprising $C_5^-$ hydrocarbons and 50–99 wt % straight run naphtha hydrocarbons having a boiling range between $C_5$–460° F. to generate in said lower elutriating section reactive fragments and an upgraded straight run naphtha fraction which are discharged up from said lower elutriating section into the dilute phase riser which is contiguous with and above said lower elutriating section; adding a resid feed to the base of the dilute phase riser and reacting in said dilute phase riser resid with reactive fragments generated in said lower elutriating section; adding to an upper portion of said dilute phase riser additional hot regenerated elutriable catalyst mixture and adding gas oil boiling range hydrocarbons and discharging the dilute phase transport riser up into the base of the upper elutriating section which is contiguous with and above said riser; adding to said upper elutriating section a recycled hydrocarbon fraction comprising hydrocarbons boiling within the range of 200°–500° F.; and discharging from the top of the riser cracked products and catalyst.

In an apparatus embodiment, the present invention provides an apparatus for the catalytic cracking of heavy feeds to lighter products comprising a vertical riser having a cross-sectional area and an inlet in a base portion for hot, regenerated catalyst and feed and an outlet at the top of the riser for cracked products and resulting spent catalyst characterized by a lower elutriating section comprising at least one inlet for a hydrocarbon feed and an inlet for an elutriable mixture of catalyst particles, said lower elutriating section comprising a lower section having a cross-sectional area and an upper section having a reduced cross-sectional area relative to said lower section, and having an upper outlet in said upper section for the discharge of cracked products and catalyst; a dilute phase transport riser means having a lower inlet connective with the outlet of said lower elutriating section, at least one inlet for a hydrocarbon containing feed, said dilute phase transport riser having a reduced cross-sectional area relative to said lower elutriating section, and having, at an upper portion thereof, an inlet for a mixture of hot, regenerated catalyst, and having an upper outlet for discharge of cracked products and catalyst; an upper elutriating riser section having an inlet at the base connective with said riser outlet, and having at least one inlet for addition of a hydrocarbon stream, said upper elutriating section comprising a lower section having a cross-sectional area and operatively connected with said outlet of said dilute phase transport riser and an upper section having an increased cross-sectional area relative to said lower section, and an upper outlet connective with said upper section of said upper elutriating section for the discharge of cracked products and spent catalyst.

DETAILED DESCRIPTION

Figure 1:
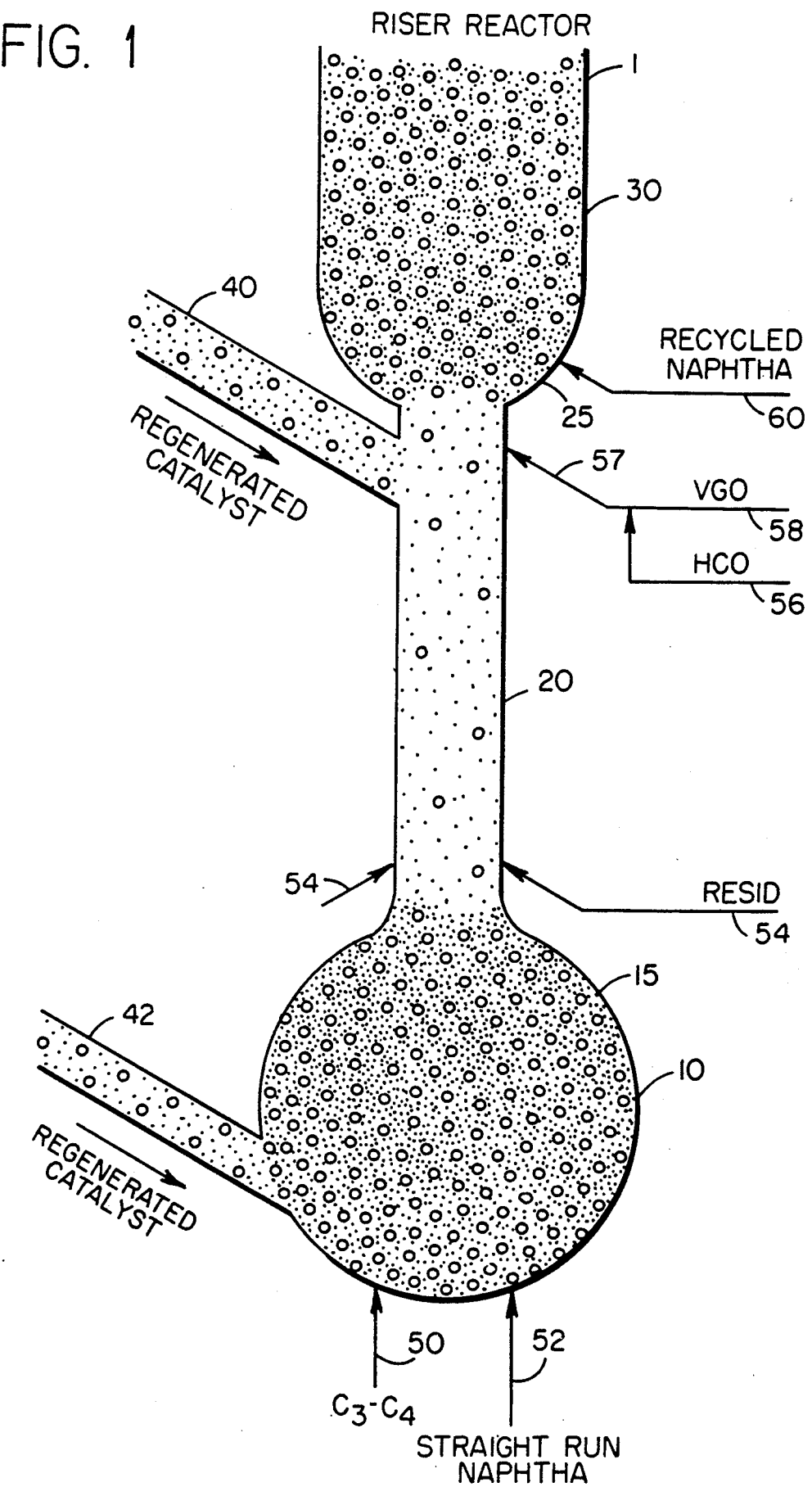
FIG. 1 illustrates a single riser FCC reactor of the invention.

Each important parameter of the process will be discussed. Those parts of the process which are conventional will receive only brief mention. The following will be considered:

1. Conventionally sized FCC catalysts (e.g., REY in matrix)
2. Additive FCC catalysts (e.g., ZSM-5 in a matrix)
3. $H_2$ deficient feeds (e.g., Resids)
4. Light $H_2$ rich feeds (e.g., propane)
5. Straight run naphtha
6. Recycled naphtha
7. FCC cracking conditions
8. Fragment generation—Naphtha cracking
9. Riser elutriation
10. Stripper
11. Conventional catalyst regeneration (e.g., w/air)
12. Catalyst reactivation (e.g., w/olefins)

Although each parameter is discussed, not all embodiments of the invention will require all elements discussed above. All elements will cooperate to upgrade heavy feeds, but economics will determine if, e.g., there is a reasonable return on investment from having both riser elutriation and stripper elutriation.

CONVENTIONALLY SIZED FCC CATALYST

The conventionally sized FCC catalyst preferably comprises one or more large pore zeolites, or large pore cracking component, in a matrix.

An optional, but preferred component is a very large pore cracking component.

The FCC catalysts typically have a particle diameter ranging from 20 to 150 microns, and averaging around 60–80 microns.

Matrix

The matrix can be conventional. The function of the matrix in catalytic cracking catalyst is well known. Briefly stated, it protects the relatively soft and fragile molecular seive components from physical damage. The matrix acts to some extent as a sodium and metals sink, and minimizes localized high temperatures when burning coke from the molecular sieve.

The matrix functions not only as described above but also can act as an efficient metals getter or sink. Other metal getters, e.g., MgO or CaO may be present as part of the matrix, or as a separate additive.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, molecular sieves materials have been incorporated into naturally occurring clays, e.g., bentonite and kaolin.

In addition to the foregoing materials, the zeolite or molecular sieve for use herein can be composited with a porous matrix material such as silica-alumina, silica-magnesium, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

Large Pore Cracking Component

The large-pore molecular sieve cracking component may be a conventional zeolite. Some of these, and patents describing their preparation are discussed hereinafter. Zeolite X, zeolite Y, and preferably higher silica forms of zeolite Y such as dealuminized Y (DAY) Y; U.S. Pat. Nos. 3,442,795; 4,331,694) ultrastable (USY; U.S. Pat. No. 3,449,070), ultrahydrophobic Y (UHP-Y; U.S. Pat. No. 4,401,556) silicon substituted Y and similar materials are preferred for use herein. Zeolite beta (U.S. Pat. No. 3,308,069) or Zeolite L (U.S. Pat. Nos. 3,216,789; 4,544,539; 4,554,146 and 4,701,315) may also be used. These materials may be subjected to conventional treatments, such as impregnation or ion exchange with rare earths to increase stability. These patents are incorporated herein by reference.

These large-pore molecular sieves have a pore opening of about 7 angstroms. In current commercial practice, most of the cracking of large molecules in the feed is done using these large pore molecular sieves.

Very Large Pore Cracking Component

In addition to the large-pore cracking components described above which have found extensive use commercially, several recently developed very large-pore cracking components may also be used. All of these materials have an equivalent pore size greater than 7 Angstroms. Some are molecular sieves (such as VPI-5) while others are not (expanded clays).

VPI-5 is a molecular sieve with pores larger than about 10 Angstrom units in diameter. It is an aluminophosphate sieve with 18-membered rings of T-atoms. Such molecular sieves have very large pore volumes, and extremely large pore openings. Such large pore sieves would be very useful for cracking the very large molecules associated with high boiling or residual fractions. VPI-5 was described by M. Davis, C. Saldarriaga, C. Montes, and J. Garces in a paper presented at "Innovations in Zeolite Materials Science" Meeting in Nieuwpoort, Belgium, Sept. 13-17, 1987. See also M. E. Davis, C. Saldarriaga, C. Montes, J. Garces and C. Crowder, Nature 331, 698 (1988).

Pillared, interlayered clays or silicates may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. Nos. 4,515,901 and 4,367,163 are incorporated herein by reference.

U.S. Pat. No. 4,757,041, which is incorporated herein by reference, discloses a class of pillared interlayered clay molecular sieve products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, GA, In, Mo, Nb, Ni, Ti, Tl, W and Zr. Such layered silicates may be used as all or part of the large pore cracking component of the present invention.

Published European Application EP 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, which have a three dimensional crystal framework of suitable size may also be used as the large pore cracking component. U.S. Pat. Nos. 4,440,871 and 4,741,892 and 4,689,138, which are incorporated herein by reference, disclose silicoalumino phosphate molecular sieves.

ADDITIVE FCC CATALYSTS

It is preferred to use an additive catalyst, with different properties than the conventional catalyst. Preferred additives are shape selective zeolites. Any zeolite having a constraint index of 1-12 can be used herein. Details of the Constraint Index test procedures are provided in J. Catalysis 67, 218-222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. Pat. Nos. 3,702,886, U.S. Pat. No. Re. 29,948 and in U.S. Pat. No. 4,061,724 (describing a high silica ZSM-5 as "silicalite").

ZSM-11 is described in U.S. Pat. No. 3,709,979.

ZSM-12 is described in U.S. Pat. No. 3,832,449.

ZSM-23 is described in U.S. Pat. No. 4,076,842.

ZSM-35 is described in U.S. Pat. No. 4,016,245.

ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such catalysts include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably relatively high silica shape selective zeolites are used, i.e., with a silica/alumina ratio above 20/1, and more preferably with a ratio of 70/1, 100/1, 500/1 or even higher.

The additive zeolite may also contain additional components which promote paraffin aromatization at catalytic cracking conditions.

Gallium exchanged or impregnated ZSM-5 is especially preferred for use herein because of its ability to convert light paraffins such as propanes and butanes into aromatic hydrocarbons which are valuable as petrochemicals or as high octane gasoline blending components. Preferably 0.05 to 10 wt %, and most preferably 0.1 to 2.0 wt % gallium is associated with the aromatization zeolite.

It is possible, and preferred, to use the same shape selective zeolite for both paraffin cracking/isomerization and for aromatization. Control of the acidity of the zeolite and of the nature and amount of the additional components which promote aromatization permits this. Partial exchange of HZSM-5 with gallium is one way to do this.

In this case, the ZSM-5 would preferably contain 0.05 to 1.0 wt % gallium. The reduced gallium content allows both paraffin cracking/isomerization and aromatization to occur.

Preferably three zeolite or molecular sieve components are used, large pore, paraffin cracking isomerization and aromatization zeolites which comprise 5-90 wt. % of the finished catalyst, with the remainder being matrix. On a matrix free basis, the relative ratios of the three zeolites can vary greatly, depending on feedstocks, products desired, and to a lesser extent on catalytic cracking conditions.

In general, the function of the large pore cracking component is bulk conversion of heavy feed to lighter materials, including light paraffins and light olefins in the $C_2$-$C_{10}$ range.

The light paraffins are not preferred products. The $C_5+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite preferably has two functions, cracking and aromatization. The cracking/isomerization catalyst converts a significant portion of these paraffins to olefins and iso-olefins, with much higher octane number, in the case of the $C_5+$ olefins, and much more reactivity in the case of the $C_4-$ olefins.

The light olefins produced by the shape selective cracking/isomerization catalyst and by the large pore cracking catalyst can be easily upgraded in conventional alkylation units. In addition, the iso-olefins can be processed in etherification units to high octane oxygenates such as MTBE or TAME. By increasing the amount of shape selective cracking/isomerization component present it is possible to enhance the production of $C_2$-$C_{10}$ olefins and, via subsequent alkylation or etherification steps, increase gasoline yields and octane number, with aliphatic components rather than aromatic components.

The shape selective aromatization zeolite converts $C_{10}-$ paraffins, and especially $C_4-$ paraffins, to aromatics. The aromatics produced, primarily benzene, toluene, and xylene (BTX) are extremely valuable both as petrochemicals or as high octane gasoline blending components.

The additive zeolite can be modified in activity by dilution with a matrix component of significant or little catalytic activity. The matrix may act as a coke sink. Catalytically inactive, inorganic oxide matrix material is preferred because of its porosity, attrition resistance and stability under the cracking reaction conditions encountered particularly in a fluid catalyst cracking operation. The additive catalyst may contain up to 50 wt % crystalline material and preferably from 0.5 to 25 wt % in a matrix.

The matrix may include, or may be, a raw or natural clay, a calcined clay, or a clay which has been chemically treated with an acid or an alkali medium or both.

The additive catalyst should, when mixed with the conventionally sized FCC catalyst, form an elutriable catalyst mixture. By this is meant that the two kinds of catalyst can be separated at least to some extent because of different settling rates of each kind of catalyst in an upflowing gas stream. Settling rates depend on the density, size and/or shape of the catalyst.

Increased density increases residence time. To increase the residence time of the additive, e.g. the shape selective zeolite catalyst in the riser, the additive density can vary from 0.6 to 4.0 gm/cm$^3$, and preferably from 2.0 to 3.0 gm/cm$^3$, when the density of the conventional catalyst varies from 0.4 to 1.1 gm/cm$^3$ density, and preferably from 0.6 to 1.0 gm/cm$^3$.

One technique for increasing the density of the additive catalyst is to composite the, e.g., shape selective zeolite with a matrix which cokes quickly. This coking increases the density of the additive in situ. An illustrative matrix is any of the hydrated aluminas which in situ form one or more of the transition aluminas which have a high coking rate. In the coked-up state, the additive is more resistant to attrition from collision with other particles in the riser. Such collisions also slow down the conventional catalyst in the riser by colliding with it, and knocking it back down the riser, momentarily.

Conventional steps can be taken during catalyst manufacture, e.g., adding a weighting agent, to increase the catalyst density.

The particle size of the additive, and the conventional catalyst, can be adjusted by conventional steps during manufacture. As between two otherwise identical particles of different size, the larger will remain in the riser longer. To increase the residence time of the additive in the riser the particle size of the additive should be larger than that of the conventional catalyst. For example, the particle size of the additive can vary from 100 microns to 70,000 microns, and preferably from 1000 to 25,000 microns while the particle size of the conventional catalyst varies from 20 to 150 microns, and preferably from 40 to 120 microns.

The shape, or geometry, also affects relative settling rates. The more irregular the shape (i.e., the more the shape deviates from a sphere), the longer the residence time of the particles in the riser. Irregular-shaped particles can be readily made by using an extruded catalyst or crushing the extrudate.

The settling rate depends on the interaction of density, particle size and particle shape. These factors each contribute to the desired result. For example, the additive catalyst can simultaneously be denser, larger and more irregular in shape than the conventional catalyst. These factors may partially offset one another, e.g., a much denser and slightly smaller particle size additive can have a significantly faster settling rate than the conventional catalyst.

$H_2$ DEFICIENT FEEDS

Suitable charge stocks for cracking in the riser comprise the heavy hydrocarbons generally and, in particular, heavy petroleum fractions such as gas oils, thermal oils, residual oils, cycle stocks, whole crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. In short, any conventional feedstock, and preferably a hydrogen-deficient feedstock can be used in the process of this invention.

Preferably the heavy feed, such as resid, is given an activation pretreatment just prior to processing herein. Microwaving, or visbreaking at an equivalent reaction time (ERT) of 500-1500 ERT seconds, renders the heavy feeds more susceptible to upgrading reactions in the riser cracking process of the present invention. More details on suitable heavy feeds, and thermal treatments prior to FCC processing are given in U.S. Pat. No. 4,749,470, which is incorporated by reference.

LIGHT $H_2$ RICH FEEDS

Suitable hydrogen-rich hydrocarbon feeds are those containing 12 to 25 wt % hydrogen, e.g., $CH_4$, $C_2H_6$, $C_3H_8$, $C_4$−mixtures or $C_5$−mixtures and similar materials. Any or all of the $C_1$ to $C_5$ hydrocarbons recovered from the process can be used as light $H_2$-rich feed to the lower region of the riser where these and other hydrogen-rich hydrocarbon materials undergo thermal cracking due to the presence of the hot, freshly regenerated catalyst and other reactions due to the presence of the additive, e.g., the medium pore zeolite catalyst. The light $H_2$-rich feed, when cracked in the base of the riser generates gasiform material contributing mobile hydrogen species and/or carbon-hydrogen fragments.

These fragments may react to some extent with the straight run naphtha (discussed below) but preferably a majority of the light reactive fragments reacts with the heavy, hydrogen deficient feed such as resid, added to a downstream portion of the riser.

STRAIGHT RUN NAPHTHA

Straight run naphtha comprises primarily gasoline boiling range hydrocarbons, typically, $C_5$-460° F. hydrocarbons. Some variability in end point is intended. Light straight run naphtha might have an end boiling point of about 300° F. Preferably only minor amounts of the light straight run naphtha contemplated for use herein has an end point in excess of 400° F.

The straight run naphtha fraction should not include any naphtha boiling range hydrocarbons produced by other catalytic or thermal processes. This means that the straight run naphtha should not include any coker naphtha, visbreaker naphtha, or naphtha produced by a catalytic cracking process.

Straight run naphthas, although fairly low in boiling range, are fairly difficult to upgrade efficiently in FCC riser cracking units. We recognize that optimum processing of straight run naphtha requires both high temperature and long residence time. The latter condition is quite different from what is considered desirable for cracking of conventional FCC feeds.

RECYCLED NAPHTHA

Recyled naphtha streams contemplated for use herein comprise naphtha boiling range materials, and preferably relatively heavy naphthas, which are obtained as the result of a catalytic cracking process.

Preferably the initial boiling point of the recycled naphtha is somewhat higher than that of the straight run naphtha. The initial boiling point should be in excess of 200° F., preferably in excess of 250° F., and most preferably in excess of 275° F. The end point of the recycled naphtha can be as low as about 400° F., but preferably the end point is 460° F., or even higher, with end points up to about 500° F. being contemplated.

FCC CRACKING CONDITIONS

The FCC cracking conditions include a riser top temperature from 930°-1100° F., preferably 970°-1050° F., and most preferably 985°-1025° F.; catalyst/oil weight ratios from 3-12, preferably 4-11, and most preferably 5-10; catalyst residence time of from 0.5-15 seconds, preferably 1-10 seconds.

FRAGMENT GENERATION AND STRAIGHT RUN NAPHTHA CRACKING

The light, $H_2$-rich feed is converted into reactive fragments both thermally and catalytically. Contact of light $H_2$-rich feed with hot, regenerated conventionally sized FCC catalyst will both thermally and catalytically crack the light $H_2$-rich feed into reactive fragments.

Temperatures can range from 593° to 816° C. (1100° to 1500° F.) and preferably from 621°-788° C. (1150° to 1450° F.), most preferably 677° to 732° C. (1250° to 1350° F.). The catalyst to feed ratio can be 50:1 to 200:1 and preferably is 100:1 to 150:1. The catalyst contact time can be 10 to 50 seconds and preferably is 15 to 35 seconds. Light olefin production is maximized by less severe operation.

Aromatics production is maximized by using ZSM-5, preferably 0.1 to 25 wt % ZSM-5 and more preferably 1 to 10 wt % ZSM-5.

The easiest way to generate a lot of fragments is to have large amounts of hot regenerated conventional catalyst contact relatively small amounts of light, hydrogen-rich feeds such as propane.

The straight run naphtha is also cracked extensively in the fragment generation zone. As the same zone is used for both fragment generation and naphtha cracking, reaction temperature and catalyst residence time can be identical.

Although both the light $H_2$-rich feed and straight run naphtha are added to the same zone, it is possible to vary significantly the reaction mix that occurs in the fragment generation zone by varying the relative amounts of a conventionally sized catalyst to shape selective additive. More details regards adjusting the amount of additive catalyst relative to conventionally sized FCC catalyst are discussed below, under riser elutriation.

RISER ELUTRIATION

It is preferred to have riser elutriation zones both at the bottom and top of the riser, i.e., portions of increased cross-sectional area. The increased cross-sectional area lowers superficial vapor velocity in the riser, which allows the catalyst (preferably additive) with the highest settling velocity to remain longer in the riser.

As a general guideline, the feed rate, riser cross-sectional area, and additive catayst properties should be selected so that the additive catalyst settling rate approaches the superficial vapor velocity expected in the riser.

Riser expansion to handle increased molar volumes in the riser reactor would not change superficial vapor velocity and would not produce significant elutriation.

Elutriation of catalyst preferably occurs both in the bottom of the riser reactor, and in an upper portion of the riser reactor. Catalyst elutriation is determined largely by the laws of physics, i.e., the additive catalyst has a given settling velocity at the conditions experienced in a given portion of the riser. If the settling velocity of the additive approaches the superficial vapor velocity in the riser, then the additive catalyst will tend to float, or remain at a given elevation for quite a long period of time. The additive catalyst will not remain trapped forever in e.g., the base of the riser when the settling velocity exactly equals the superficial vapor velocity at a given point. This is because there is much backmixing, and random motion in the enlarged base of the riser. When the additive catalyst eventually enters a narrowed down region of the riser reactor, the superficial vapor velocity will increase and sweep the particle out of the enlarged base portion.

It is possible to change the superficial vapor velocity in the riser by either increasing or decreasing the total amount of hydrocarbon flow, increasing or decreasing the amount of inert gas such as steam added to the riser, or increasing or decreasing the reactor pressure. It is also possible, and may be preferred in many instances, to have an additive inventory comprising several sizes of additive catalysts. If more additive reactions must be promoted in the riser reactor, some of the additive catalyst circulating through the unit can be removed and replaced with a relatively heavier additive, of vice versa.

Preferably, the physical conditions within the riser reactor, at the base, and the physical properties of the additive and conventionally sized catalyst are such that the additive comprises at least 10 wt %, and preferably, at least 50 wt %, and most preferably, over 75 wt % of the catalyst inventory in the base of the riser.

Similar factors apply to the elutriating portion at the top of the riser reactor. Generally because there are so many more feedstreams present, and cracked products, at the top of the riser reactor, it will be prudent to size the top of the reactor so that much less enhancement or segregation of additive occurs in the top of the reactor. Thus in the upper, elutriating portion of the riser reactor, the additive concentration may be enhanced two or more fold over its concentration in the FCC catalyst inventory, but not concentrated so much as occurs in the base portion of the riser reactor. In the upper portion of the riser reactor, the shape selective additive is preferably at least 10 wt % of the catalyst present in that region, more preferably in excess of 15%, and most preferably in excess of 25 wt %.

By operation in this way, relatively restricted kinds and amounts of hydrocarbon feeds added to the elutriating zone at the base of the riser, and operation with superficial vapor velocities approaching the settling velocities of the additive, it is possible to greatly increase the apparent concentration of additive in the unit without unduly limiting the flexibility of the FCC unit to accomodate changes in charge stock, etc. Operation in the upper elutriating zone is with somewhat higher vapor velocities, well above the settling velocities of the heaviest particles, so operation in the second elutriating zone tolerates very well changes in unit operation.

STRIPPER

It is preferred, but not essential, to operate with a catalyst stripper which separates more from less elutriable catalyst.

Separation in the stripper can be achieved by particle size difference alone, i.e., a sieve action. Preferably a stripper is used which separates conventional catalyst from additive catalyst by exploiting differences in settling velocity.

A closely related approach is one which relies to some extent on settling properties and to some extent on catalyst density.

Stripper elutriation separates additive catalyst from conventionally sized catalyst upstream of the catalyst regenerator. If elutriation occurred in the catalyst regenerator, then the additive catalyst (which may not need regeneration and may be damaged by regeneration) is unecessarily subjected to regeneration. Thus stripper elutriation significantly reduces additive catalyst residence time in the FCC regenerator.

Stripping efficiency can be improved by adding one or more light olefins to a stripping zone. The light olefins form higher molecular weight products (which are valuable) and the exothermic reactions release heat (which aids stripping).

If exothermic stripping is to be practiced, enough olefins should be added to increase the temperature at least 10° C. (18° F.) and preferably at least 38° C. (68° F.) or more.

CONVENTIONAL CATALYST REGENERATION

The conditions in the FCC catalyst regenerator are conventional. U.S. Pat. No. 4,116,814 (and many other patents) discuss regeneration conditions.

An elutriating regenerator may be used to reduce the residence time of the additive in the regenerator. This is not essential.

CATALYST REACTIVATION

Reactivation of additive catalyst, or conventional catalyst, with hydrogen or hydrogen-rich gas may be practiced herein. Catalyst reactivation is, per se, conventional.

The invention can be better understood with reference to FIG. 1 which is a simplified, schematic illustration of one embodiment of the present invention.

An elutriable catalyst mixture from a regenerator (not shown) is discharged via line 42 into the base elutriating portion 10 of riser reactor 1.

A light, $H_2$-rich stream is added via line 50 to the bottom of elutriating base 10. The preferred light hydrocarbons are simply a mixed $C_3$-$C_4$ or $C_4^-$ hydrocarbon stream obtained from a fractionator associated with the FCC unit, a gas plant, or other refinery source. A straight run naphtha is added via line 52.

In the elutriating base 10 of the riser reactor, several reactions go on simultaneously. A majority of the $C_4^-$ hydrocarbons are converted therein to reactive fragments. The straight run naphtha is converted to a limited extent to reactor fragments, with the primary reaction being selective cracking of normal paraffins over the shape selective zeolite additive.

The reaction conditions in elutriating base 10 include the following. Temperatures should be in the range of 1110°-1500° F., preferably 1150°-1400° F., and most preferably 1200°-1350° F. The pressures in the base are 15-50 psia, preferably 20-45 psia, and most preferably 25-40 psia.

The space velocity, based on the weight of additive catalyst present, is 0.5-10 hr$^-$, and preferably is about 1-5 hr$^{-1}$.

The space velocity on conventional catalyst is typically 10-100 hr$^{-1}$, and preferably is about 20-50 hr$^{-1}$.

The amount of shape selective zeolite additive present in the elutriating base is much increased because the fastest settling additive tends to accumulate in the base portion of the riser while the smaller, conventionally sized FCC catalyst particles are rapidly swept up the riser. The superficial vapor velocity increases in transition section 15 connecting the elutriating base 10 with the dilute phase transport riser 20.

A resid feed is added via one or more inlets 54. The resid feed is preferably preheated to a temperature of 400°-700° F. Relatively large amounts of atomizing steam, preferably on the order of 1-5 wt % or more, are added to assist in atomization of the heavy resid feed.

Conditions in the dilute phase transport riser include a temperature which is preferably at least 150° F. reduced as compared to the temperature in the elutriating base. Preferred temperatures in the transport riser include a temperature of 900°-1150° F., preferably 950°-1100° F. Catalyst/oil ratios are preferably 3:1-10:1. The catalyst residence time in the dilute phase transport riser will typically be within the range of ½-15 seconds.

At the top of dilute phase transport riser 20 additional elutriable catalyst mixture from a catalyst regenerator (not shown) is added via line 40. At about the same elevation, or preferably at a slightly higher elevation, relatively heavy, but distillable, hydrocarbons are added. A vacuum gas oil may be added via line 58, and a recycle stream, such as a heavy cycle oil via line 56 may be added together (as shown) via line 57 or added via separate means not shown. The resulting mixture of heavy distillable feeds, hot regenerated catalyst from line 40, and the mixture of reaction products and partially spent catalyst moving up dilute phase transport riser 20 enter, via transition section 25, the upper elutriating portion 30 of riser 1. A recycled naphtha stream is added to this upper elutriating section via line 60.

Reaction conditions in the upper elutriating portion include temperatures which can be about the same as those in the dilute phase transport riser. The weight hourly space velocity is preferably within the range of 2-10 hrs$^{-1}$ based on additive and within the range of 20-150 hrs$^{-1}$ based on conventional catalyst.

Figure 2:
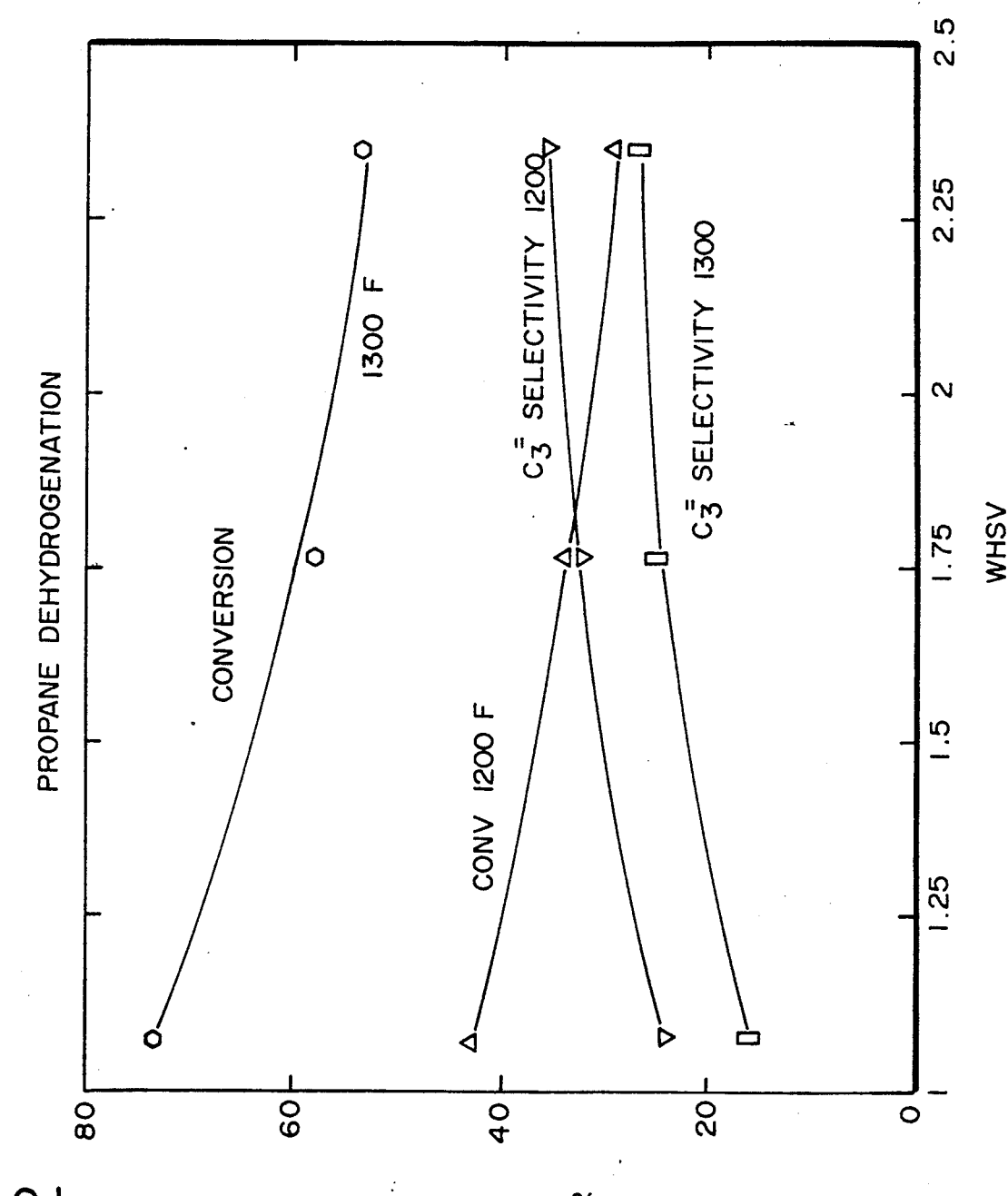
FIG. 2 illustrates propane dehydrogenation.

The following illustrative embodiment is based on extensive laboratory work on propane dehydrogenation (reported in FIG. 2). The illustrative embodiment is believed to be a reasonable estimate of the results that would be achieved in commercial practice of the invention.

In the lower elutriating zone, $C_3$ cracking is the primary operation. The space velocity, based on additive, would be 1-2 hrs$^{-1}$, with a temperature of 1150°-1300° F. Such conditions would achieve conversions of propane of 40-60 percent, giving a propylene yield of 12-15 percent.

In the riser section 20 the conditions include a riser top temperature of about 985°-1020° F., a cat/oil ratio of about 5-8, a weight hourly space velocity of 30-100 hr$^{-1}$ and a conversion of 1100° F. plus material of approximately 50-60 percent to 650° F. minus material.

In the second elutriating zone 30, conditions would include a top temperature of about 960°-1000° F., a space velocity based on additive of 0.5-10 hr$^{-1}$, and a space velocity based on conventional catalyst of about 20-30 hr$^{-1}$.

TABLE 2

Product Yields from Cracking Joliet LSR Gasoline

| Compound | Feed | Product Run 175-841 |
|---|---|---|
| $C_2^-$ | 0.0 | 12.50 |
| $C_3$ | 0.0 | 8.00 |
| $C_3^=$ | 0.0 | 9.85 |
| $nC_4$ | 0.0 | 4.54 |
| $iC_4$ | 0.0 | 5.15 |
| $C_4^=$ | 0.0 | 7.21 |
| $C_5$ Paraffins | 34.92 | 11.56 |
| $C_5$ Olefins | 0.27 | 1.46 |
| $C_5$ Naphthenes | 13.06 | 2.71 |
| $C_6$ Paraffins | 39.52 | 14.71 |
| $C_6$ Olefins | 0.26 | 1.00 |
| $C_6$ Naphthenes | 5.88 | 1.34 |
| Aromatics | | |
| Benzene | 5.63 | 5.85 |
| Toluene | 0.46 | 4.03 |
| Xylene, Ethylbenzene | 0.0 | 1.78 |
| Other Aromatics | 0.0 | 1.56 |
| Coke | 0.0 | 6.7 |
| | 100.0 | 100.0 |
| $C_5^+$ Octane (R + O) | 74.0 | 80.6 |

Although not shown, it is possible to use an elutriating stripper to separate additive catalyst from conventionally sized catalyst, and/or an elutriating regenerator to minimize the residence time of the fast settling, shape selective zeolite additive in the regenerator. These extra features are beneficial, but not essential. The fast settling additive of the present invention preferably has a residence time in the elutriating riser reactor on the order of 10-20 times the residence time of the conventionally sized catalyst. Because the additive catalyst of the invention spends so much more time in the riser reactor, it is not as essential to keep the additive catalyst out of the regenerator. Provisions should be made in the FCC regenerator, such as a bottom draw, so that fast settling additive which finds its way into the regenerator is not trapped an inordinately long period of time therein.

We claim:

1. An apparatus for the catalytic cracking of heavy feed to lighter products comprising a vertical riser reactor adapted to maintain a fluidizable catalyst and said heavy feed as a dilute phase said reactor having an inlet in a base portion for hot, regenerated catalyst and feed and an outlet in a top portion of the reactor for cracked products and resulting spent catalyst characterized by;

a) a lower elutriating section comprising at least one inlet for a hydrocarbon feed and an inlet for an elutriable mixture of catalyst particles, said lower elutriating section having an average cross-sectional area and comprising a lower section having a cross-sectional area and an upper section having a reduced cross-sectional area relative to said lower section, and having an upper outlet in said upper section for the discharge of cracked products and catalyst;

b) a dilute phase transport riser means having an average cross-sectional area and a lower inlet connective with the outlet of said lower elutriating section, at least one inlet for a hydrocarbon containing feed, said dilute phase transport riser having a reduced cross-sectional area relative to said average cross-sectional area of said lower elutriating section, and having, at an upper portion thereof, an inlet for a mixture of hot, regenerated catalyst, and having an upper outlet for discharge of cracked products and catalyst;

c) an upper elutriating riser section having an average cross-sectional area and an inlet in a base portion connective with said dilute phase transport riser outlet, and having at least one inlet for addition of a hydrocarbon stream, said upper elutriating section comprising a lower section having a cross-sectional area and operatively connected with said outlet of said dilute phase transport riser and an upper section having an increased cross-sectional area relative to said lower section of said upper elutriating section, and an upper outlet connective with said upper section of said upper elutriating section for the discharge of cracked products and spent catalyst.

2. The apparatus of claim 1 wherein the dilute phase transport riser has at least one inlet at a base portion thereof for addition of resid.

3. The apparatus of claim 1 wherein the dilute phase transport riser has an upper portion and at least one inlet at the upper portion for addition of hydrocarbons boiling in the gas oil and vacuum gas oil range.

4. The apparatus of claim 1 wherein the upper elutriating section has at least one inlet in a base portion thereof for a hydrocarbon fraction.

5. The apparatus of claim 1 wherein the transport riser has at least two inlets for hot regenerated catalyst.

6. The apparatus of claim 1 wherein the ratio of the average cross-sectional area of the lower elutriating section to the average cross-sectional area of the dilute phase transport riser is within the range of 1.5–5, and wherein the ratio of the average cross-sectional area of the upper elutriating section to the average cross-sectional area of the dilute phase transport riser is 1.5–2.5.

* * * * *